United States Patent [19]

Bauch et al.

[11] Patent Number: 5,052,436
[45] Date of Patent: Oct. 1, 1991

[54] DEVICE FOR FEEDING A FLUID TO A ROTATING MACHINE PART

[75] Inventors: Karl Bauch; Wolfgang Effenberger, both of Kempten, Fed. Rep. of Germany

[73] Assignee: Ott Maschinentechnik GmbH, Kempten, Fed. Rep. of Germany

[21] Appl. No.: 498,039

[22] Filed: Mar. 23, 1990

[30] Foreign Application Priority Data

Apr. 18, 1989 [DE] Fed. Rep. of Germany ....... 3912659

[51] Int. Cl.⁵ .............................................. F16L 27/00
[52] U.S. Cl. ................................... 137/580; 192/85 A
[58] Field of Search ................. 137/580; 285/306, 307; 192/85 A; 251/149.8

[56] References Cited

U.S. PATENT DOCUMENTS

| 2,963,134 | 12/1960 | Bunner | 192/85 A |
| 3,444,972 | 5/1969 | Carstensen et al. | 192/85 A |
| 4,245,729 | 1/1981 | Lunke et al. | 192/85 A |
| 4,726,397 | 2/1988 | Stich | 137/580 |

FOREIGN PATENT DOCUMENTS

| 0250703 | 1/1988 | European Pat. Off. |
| 3600884 | 7/1987 | Fed. Rep. of Germany |
| 3810060 | 10/1989 | Fed. Rep. of Germany |
| 1505040 | 10/1967 | France |
| 1365640 | 9/1974 | United Kingdom |

Primary Examiner—A. Michael Chambers
Attorney, Agent, or Firm—Flynn, Thiel, Boutell & Tanis

[57] ABSTRACT

The device for feeding a fluid to a rotating machine part (6), in particular a machine tool spindle, has a housing (1) arranged to be fixed against rotation and a hollow shaft (2) mounted rotatably therein, one end of which, the inner end (2a) is connected by way of a sliding ring seal (5) to an inlet duct (4) in the housing (1). At the other, the outer, end (2b) of the hollow shaft (2, 2') there is provided a coupling tube (7, 7') coaxial with the hollow shaft and which is axially slidable with respect to the rotating machine part (6) and can be engaged with it with a sealing arrangement (8) interposed.

16 Claims, 3 Drawing Sheets

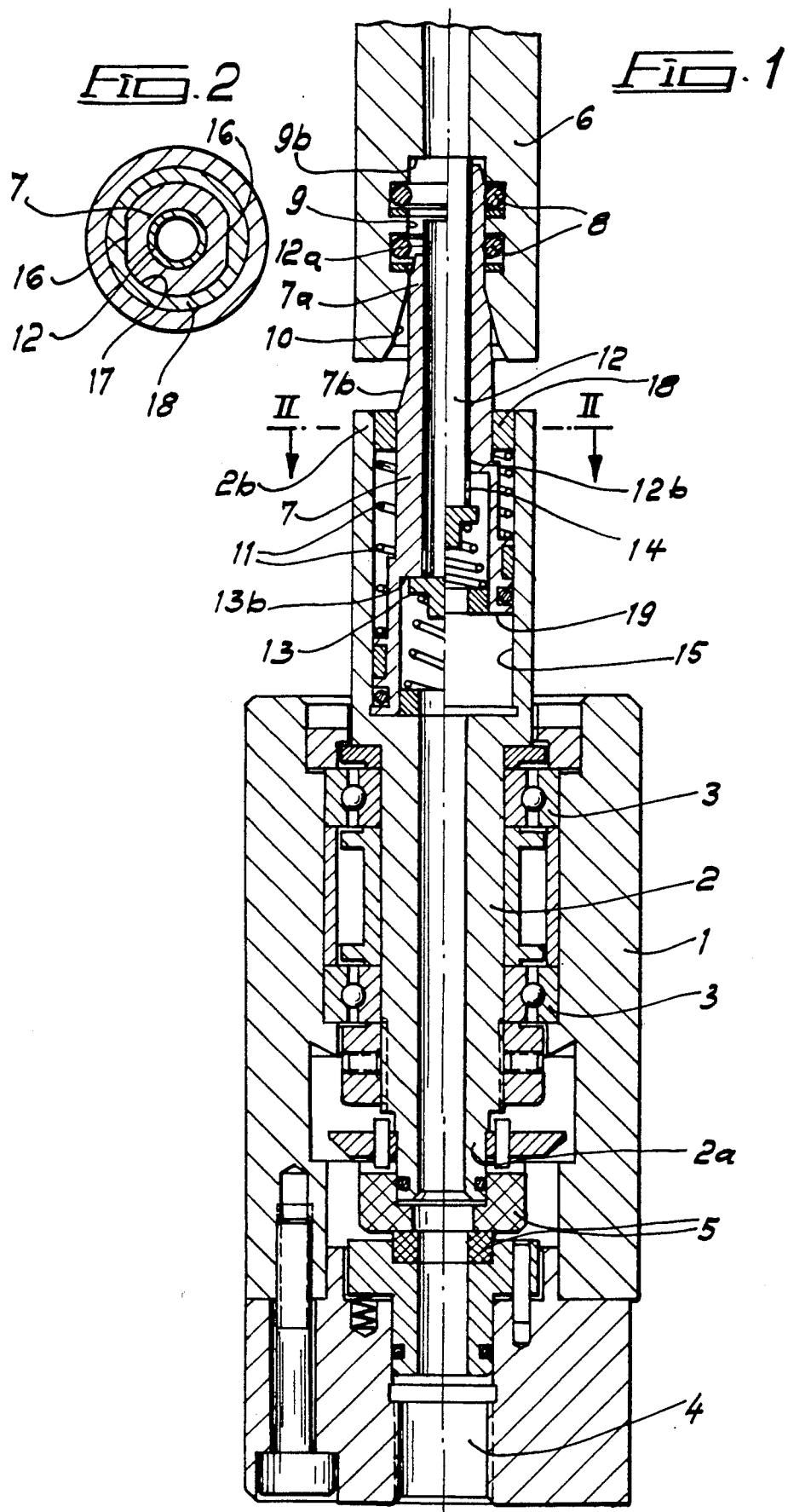

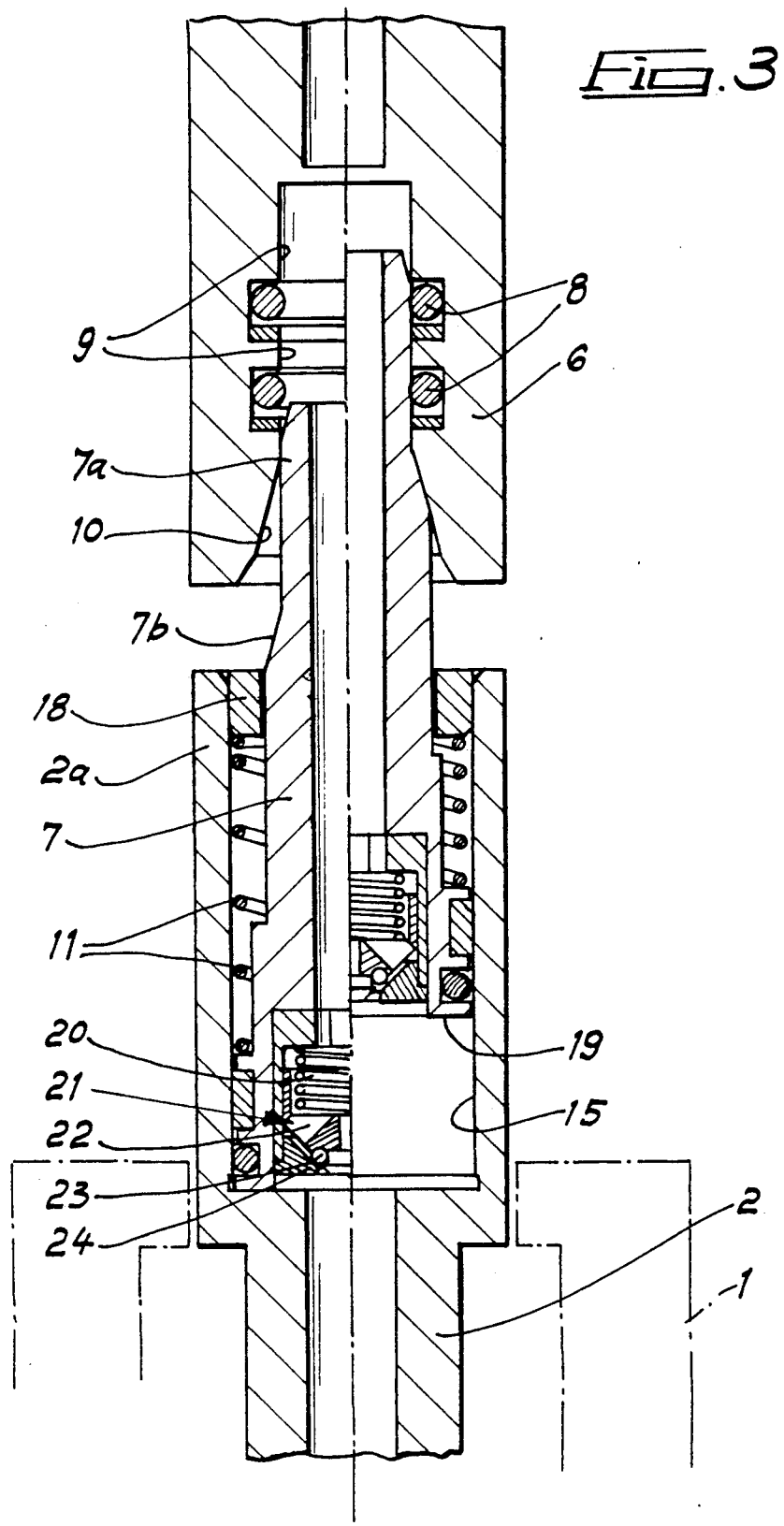

DEVICE FOR FEEDING A FLUID TO A ROTATING MACHINE PART

FIELD OF THE INVENTION

The invention relates to a device for feeding a fluid to a rotating machine part, in particular a machine tool spindle, having a housing arranged to be fixed against rotation and a hollow shaft mounted rotatably therein, one end of which, the inner end, is connected by way of a sliding ring seal to an inlet duct in the housing and the other end of which, the outer end, can be connected to the rotating machine part.

BACKGROUND OF THE INVENTION

Such devices for feeding a fluid to rotating machine part, also called "rotary lead-throughs", are known in the most diverse types and for the most diverse purposes (see Catalogue 825D "DEUBLIN Rotating UNIONS" issued by Deublin GmbH, D-6238 Hofheim-Wallau, pages 27 and 28). Such devices are employed, for example, in conjunction with machine tool spindles, the outer end of the hollow shaft being fixedly connected to the machine tool spindle or a pull rod, arranged centrally therein, of a clamping facility installed in the machine tool spindle. In this case, the device serves to feed a cooling lubricant to the tool. As long as the feed of the said fluid takes place during the rotation of the hollow shaft connected to the machine tool spindle or the clamping facility, no problems occur at the sliding ring seal, since this is lubricated by the fluid and the frictional heat produced is removed. If, however, dry machining of the workpiece without cooling lubricant is to take place, then the conventional rotary lead-throughs are not suitable for this purpose. In fact, if the cooling lubricant is absent at the sliding ring seal, then this seal is rapidly destroyed, especially at higher spindle speeds, because of lack of lubrication, but in particular because of lack of cooling. Special rotary lead-throughs have therefore been developed in which, even in the absence of feedthrough of a fluid, the cooling and lubrication of the sliding ring seal is ensured.

In a known rotary lead-through for this purpose (DE 35 42 014 C1), in the case of dry machining (dry operation), i.e. when no fluid is conveyed through the rotary lead-through, one sliding ring of the sliding ring seal can be lifted away from the other sliding ring. In the known rotary lead-through, this takes place owing to the fact that one sliding ring is arranged on a hollow plunger which is axially slidable in the housing. The hollow plunger is acted on by a spring which loads the hollow plunger in the direction away from the other sliding ring. Moreover, a stop valve spring-loaded in the direction opposite to the direction of flow of the fluid is arranged in the hollow plunger. With the stop valve closed, the plunger is first displaced by the pressure of the fluid in opposition to the force of the plunger spring and the sealing surfaces of the two sliding rings are thereby brought into contact. Only then does the stop valve open and release the flow. If, however, in dry operation, the sealing surfaces are lifted away one from the other, particles of dirt contained in the fluid, in particular the cooling lubricant, which is used again and again in the circuit, may get between the sealing surfaces. In sliding ring seals, the sealing surfaces show great flatness and are very hard. If, with the sliding ring lifted away, a small foreign body gets between the sealing surfaces and the sliding rings are thereafter pressed against one another again, this foreign body leads to rapid destruction of the sliding ring seal. In this way, with slightly contaminated fluid, the life of the sliding rings is very much shortened. Moreover, even in dry operation, in which no cooling lubricant at all has to be conducted through the lead-through, the hollow shaft rotates together with the machine tool spindle. In particular at high speeds of rotation of the spindle, this leads to unnecessary wear of the ball bearings by means of which the hollow shaft is mounted in the housing. Moreover, noise and vibration may emanate from the rotary lead-through.

In another kind of rotary lead-throughs, the problem of lubrication and cooling of the sliding rings during dry operation is eliminated in that an auxiliary coolant and lubricant is fed to the sliding rings from outside. This, however, requires a not inconsiderable design expenditure, because the auxiliary coolant and lubricant must be fed to and removed from the region of the sliding rings continuously, so that the frictional heat generated at the sliding rings is continuously eliminated. In dry operation, needless wear of the ball bearings and the sliding rings and needless loss of efficiency occur. Moreover, the above-mentioned vibration and the nuisance caused by noise are also noticeable.

Therefore, the problem underlying the invention is to provide a device of the kind mentioned at the beginning for feeding a fluid to a rotating machine part, in particular a machine tool spindle, in which in the absence of feedthrough of a fluid (dry operation) the sliding rings do not have to be lifted one away from the other and nevertheless wear thereof, bearing wear and vibration are avoided, and which does not require any separate cooling arrangement.

According to a first solution proposed by the invention, this is achieved in that a coupling tube coaxial with the hollow shaft and connected to it to be fixed against rotation is arranged to be axially slidable in the outer end thereof and the coupling tube is designed as a hollow plunger slidable in the outer end of the hollow shaft, is movable under the pressure of the fluid towards the rotating machine part in opposition to the force of a return spring and can be engaged with this machine part with a sealing arrangement interposed, in such manner that, in operation with fluid, the coupling tube can be engaged with the machine part by axial movement towards it and, in operation without fluid, can be disengaged from the machine part by axial movement away from it.

According to the invention, a second solution of the above-mentioned problem consists in that a coupling tube coaxial with the hollow shaft and connected fixedly to it is provided at the outer end thereof, the housing is movable axially with respect to the rotating machine part under the action of a servomotor and the coupling tube can be engaged with the rotating machine part with a sealing arrangement interposed, in such manner that, in operation with fluid, the coupling tube can be engaged with the machine part by axial movement of the housing towards the latter and, in operation without fluid, can be disengaged from the machine part by axial movement of the housing away from it.

Thus, in each case, the invention starts from the idea of disengaging the entire rotary lead-through from the rotating machine part in dry operation, i.e. when no fluid is to be fed to the rotating machine part. In the first proposed solution, the disengagement takes place owing to the fact that when the feed of the fluid is interrupted, the coupling tube telescopically slidable in the outer end of the hollow shaft is moved away from the rotating machine part by the force of the return spring. Engagement takes place owing to the fact that the coupling tube is moved towards the rotating machine part under the pressure of the fluid in opposition to the force of the return spring. In the second proposed solution, engagement and disengagement take place by axial movement of the entire housing containing the rotary lead-through by means of a servomotor. In both cases, when no fluid is to be fed to the rotating machine part, the entire rotary lead-through is disengaged from this part, which has several advantages. While, in dry machining, the machine tool spindle rotates, the disengaged hollow shaft is at rest. In consequence, neither wear of the sliding rings nor bearing wear can occur. Vibration is also avoided. An auxiliary cooling facility for cooling the sliding ring seals can be dispensed with. Lifting away of sliding rings in dry operation is likewise unnecessary and the disadvantages involved thereby are also avoided. All in all, the rotary lead-through has a long life, because it is completely out of action in dry operation.

A device for feeding a fluid which is under pressure to a rotating machine part is also known (FR 1 505 040) in which a hollow shaft is mounted rotatably and to be axially slidable in opposition to the force of a spring in a stationary housing. A part of the hollow shaft is in the form of a plunger. The sealing action between the rotating plunger and the stationary housing takes place through the medium of cylindrical sealing surfaces between the plunger and a cylindrical bore provided for the purpose in the housing. The clearance between the plunger and the cylindrical bore should be as small as possible in order to achieve a seal between the two parts. This requires a very high accuracy of manufacture. Even with slight wear, the sealing action diminishes considerably, since the plunger surfaces are not pressed resiliently against the cylindrical bore. Because of the considerable wear to be expected, this sealing method is also only usable for low speeds of rotation. In this known device, the axial movement of the hollow shaft is effected in that a valve arrangement with a flow bore which is eccentric with respect to the axis of rotation is provided in the plunger. The surface surrounding the valve seat is of conical form, so that with a perpendicularly extending axis of rotation, with the hollow shaft stationary, a valve ball rolls at any given time to the lowest point of the conical surface and closes the flow bore provided thereat. If a fluid under pressure is fed to the plunger, it and, consequently, the entire hollow shaft is shifted axially in opposition to the force of the spring. As a result of this axial movement, the outer end of the hollow shaft is engaged with a rotating machine part. The hollow shaft is thereby set in rotation and the eccentrically acting valve ball is acted on by centrifugal forces which move the valve ball radially outwards and lift it away from the valve seat. As a result of this, the flow is then opened up. In consequence of the described valve arrangement, the conveying through of fluid is possible only in the case of rotation. This publication has not anticipated the present invention, because if the cylindrical sealing surfaces were to be replaced by a sliding ring seal with axial sliding surfaces, these would lift away one from the other on axial movement of the hollow shaft and the same disadvantages would arise as are also present in the rotary lead-through according to the above-mentioned DE 35 42 014 C1.

In another known rotary lead-through (GB 1 365 640), the rotating machine part forms a unit with the hollow shaft. A transfer tube is provided in the hollow shaft, the tube being pressed against the rotating sliding ring by a spring and thrusting the ring against the stationary sliding ring. Owing to this, axial pressing of the sliding surfaces into contact takes place. The transfer tube is pressed constantly against the rotating sliding ring and serves to carry through a first fluid, which passes through central bores in the two sliding rings. Parallel to the central bores, the sliding rings have several flow bores arranged on a common circle, through which a second fluid can flow. This second fluid then flows further through an interspace formed between the transfer tube and the interior of the hollow shaft. Since the transfer tube serves both to carry through a fluid and for axial pressing of the sliding ring surfaces into contact, it is constantly pressed against the stationary sliding ring by the pressure spring. It cannot be disengaged from the body rotating with it or from the rotating sliding ring, except by dismantling of the entire rotary lead-through. In order to avoid unnecessary wear, it is proposed in this publication to remove the connecting pieces which serve to feed the fluids in a normally stationary housing part from this stationary housing part, so that this stationary part can join in the rotation. The removal of the connecting pieces, however, is a time-consuming and complicated matter and the re-attachment of the connecting pieces likewise requires a rather great expenditure of time. Basically, it is true, the problem underlying the present invention is solved with this known rotary lead-through, but in a different and complicated manner. Since the transfer tube is not axially movable and also cannot be disengaged from any adjacent parts during the operation of the rotary lead-through and also when the same is at a standstill, this publication also could not anticipate the present invention for want of a prototype.

BRIEF DESCRIPTION OF THE DRAWINGS

The invention is described in greater detail in the following with reference to a plurality of embodiments shown in the drawing.

In the drawing:

FIG. 1 shows a first embodiment in axial section;

FIG. 2 is a radial section on the line II—II in FIG. 1;

FIG. 3 is a partial axial section of a second embodiment;

DETAILED DESCRIPTION

Figure 4:
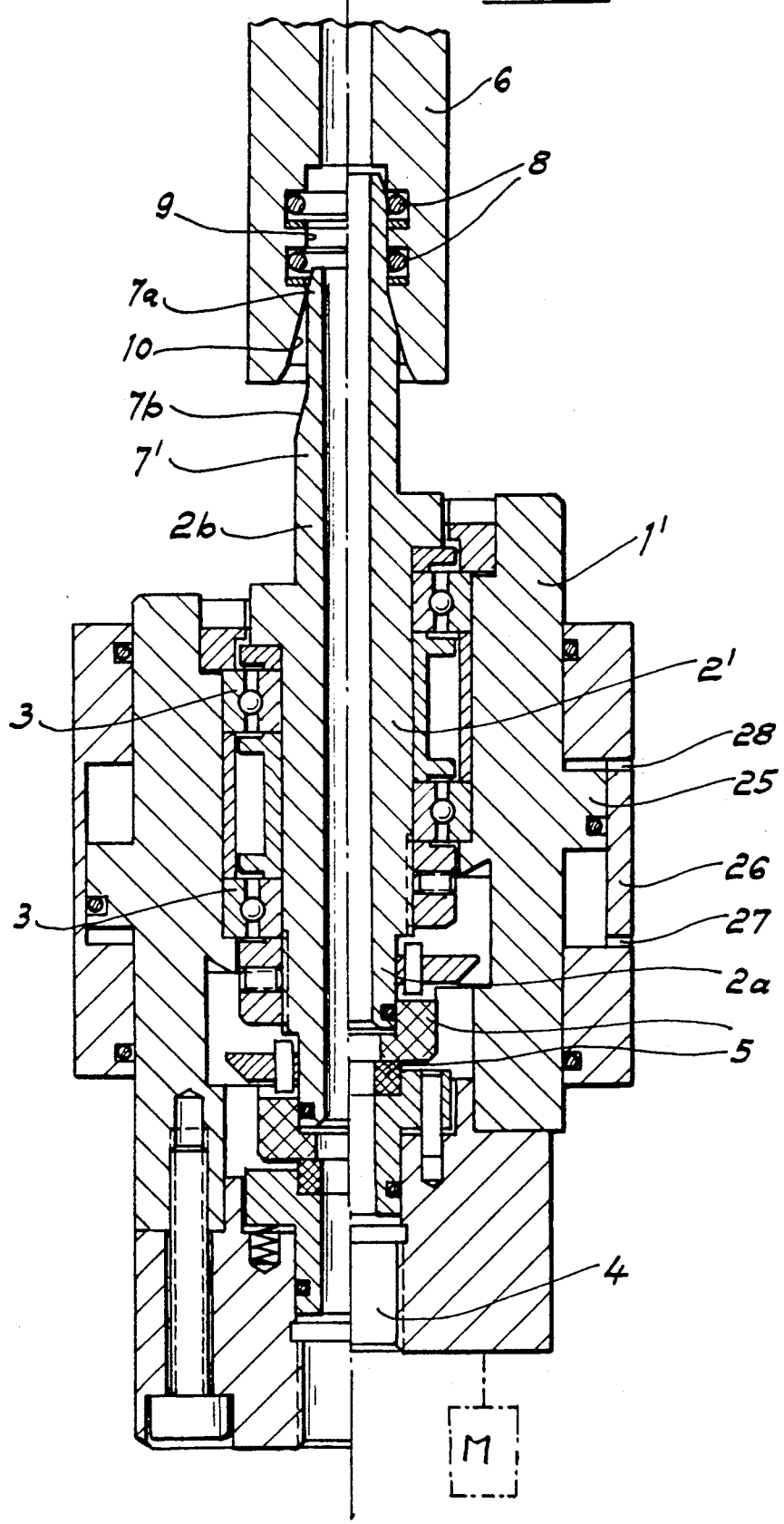
FIG. 4 is an axial section of a third embodiment.

In the drawing, the reference 1 designates a housing fixed against rotation, which in this embodiment and the one shown in FIG. 3 is also axially immovable. A hollow shaft 2 is rotatably mounted in the housing 1 by means of the ball bearing 3. Between the inner end 2a of the hollow shaft and an inlet duct 4 provided in the housing 1 there is provided a sliding ring seal 5 having in a known manner two sliding rings. The other, outer, end 2b of the hollow shaft 2 projects out of the housing 1. A rotating machine part 6 is arranged coaxially with the axis of rotation A of the hollow shaft 2 and this may be, for example, a question of the pull rod of a clamping facility arranged in a machine tool spindle.

At the outer end 2b of the hollow shaft a coupling tube 7 is provided, this being arranged coaxially with the axis A of the hollow shaft 2 and being axially slidable with respect to the rotating machine part 6. The coupling tube 7 can be engaged with and disengaged from the machine part 6 by axial movement, a sealing arrangement 8 being provided for sealing the coupling tube 7 with respect to the machine part 6. In FIGS. 1, 3 and 4, the engaged position is shown on the right and the disengaged position on the left in each case.

At its free end, the coupling tube 7 has an extension 7a which can be pushed into a corresponding bore 9 in the rotating machine part 6. This extension 7a is suitably of cylindrical form. Two O-ring seals 8 surrounding the cylindrical extension in the engaged position are provided in the bore 9.

The extension 7a is adjoined by a frustoconical portion 7b. In the rotating machine part 6 there is provided a corresponding frustoconical surface 10 against which the frustoconical portion can be pressed in the engaged position. As a result of this contact pressure, the transmission of torque is ensured in the engaged position of the machine part 6 and the coupling tube 7 and wear of the O-rings 8 is thereby avoided.

In the embodiments shown in FIGS. 1, 2 and 3, the coupling tube 7 is in the form of a hollow plunger and is movable towards the rotating machine part 6 under the pressure of the fluid in opposition to the force of the return spring 11. In the embodiment shown in FIGS. 1 and 2, an overflow tube 12 is axially slidable in the coupling tube 7, the outer end 12a of the tube projecting from the extension 7a of the coupling tube 7. The other, inner, end 12b of the overflow tube 12 bears against the spring-loaded valve body 13 of a stop valve closing in the direction of flow of the fluid. Moreover, in the overflow tube 12, in the vicinity of the inner end 12b, a plurality of overflow openings 14 is provided, these being covered by the coupling tube 7 in the disengaged position. The coupling tube 7 in the form of a plunger is moreover axially slidable in a cylinder 15 at the outer end 2b of the hollow shaft 2, but is connected to the hollow shaft to be fixed against rotation. To this end, the coupling tube 7 has two flat surfaces 16 in its middle portion and is guided non-rotatably in a corresponding opening 17 in a ring 18 forced into the outer end 2b.

FIG. 1 shows in the left half the disengaged position, when the fluid, for example cooling lubricant, is pressureless in the inlet duct 4. Under the action of the return spring 11, the extension 7a is partially withdrawn from the bore 9 to such an extent that it no longer touches the O-rings 8. There is no connection between the rotating machine part 6 and the coupling tube 7, so that the coupling tube 7 and all the parts of the rotary lead-through are at rest.

If a cooling lubricant is now to be fed to the rotating machine part 6, then it is introduced under pressure into the inlet duct 4. Since the valve body 13 is seated on the valve seat 13b, the flow is blocked in the coupling tube 7. Consequently, the coupling tube 7, which is in the form of a plunger, is pushed with its extension 7a into the bore 9 by the pressure of the fluid in opposition to the force of the return spring 11. Shortly after the extension 7a has been pushed into the lower O-ring 8, the outer end 12a of the overflow tube 12 comes into abutment against the shoulder 9b of the bore 9. If the coupling tube 7 is shifted further towards the rotating machine part 6 under the pressure of the fluid, then the inner end 12b of the overflow tube 12 moves the valve body 13 away from the valve seat 13b. By reason of the larger annular area of the plunger, however, the coupling tube 7 is shifted further towards the rotating machine part 6 until the frustoconical portion 7b bears against the frustoconical surface 10. Because of this, a torque is transmitted from the rotating machine part 6 to the coupling tube 7 and from this by way of the ring 18 to the hollow shaft 2. In the connected-up state, the valve body 13 is moved away from the valve seat 13b and the fluid can flow unimpeded through the overflow openings 14 into the overflow tube 12 and from this into the rotating machine part 6. If the pressure on the fluid is terminated, the return spring 11 moves the coupling tube 7 into its disengaged position again.

The embodiment shown in FIG. 3 differs from the embodiment shown in FIGS. 1 and 2 only in the design of the stop valve. Parts with the same function are designated by the same reference numbers and the above description applies equivalently to the embodiment illustrated in FIG. 3. In the embodiment illustrated in FIG. 3, the overflow tube 12 is absent. In this embodiment, a stop valve 21 opening in the direction of flow of the fluid in opposition to the force of a biasing spring 20 is arranged in the coupling tube 7. The valve body 22 is equipped with a sealing ring 23 which bears against the valve seat 24 in the closed position of the valve. The biasing force of the biasing spring is so chosen that the valve body 22 is removed from the valve seat 24 only when the frustoconical portion 7b bears against the frustoconical surface 10. In this embodiment, the stop valve 21 opens in dependence upon pressure and not tied to position, as in the preceding embodiment.

Stop valves in the stream of fluid may lead to problems. For this reason, FIG. 4 shows an embodiment which can be operated without such stop valves. The coupling tube 7' in this embodiment is connected fixedly to the outer end 2b of the hollow shaft 2'. The coupling tube 7' and the hollow shaft 2' may also consist of one part, as shown in the drawing. The housing 1' is movable axially with respect to the rotating machine part 6 under the action of a servomotor. In the embodiment shown, the housing 1' is provided with an annular piston 25 and is slidable in a cylinder 26 surrounding the housing concentrically. In this embodiment, hydraulic or pneumatic pressure can be applied to both sides of the annular piston 25 with an additional pressure medium. By introducing the pressure medium into the lower feed bore 27, the housing 1' is shifted in the axial direction towards the rotating machine part 6. As a result of this, the coupling tube 7' arrives from its disengaged position shown on the left in FIG. 4 in its engaged position shown on the right in FIG. 4. By introducing pressure medium into the second feed bore 28, the housing 1' can be moved in the opposite direction away from the rotating machine part 6 and the coupling tube 7' can thereby be disengaged from the machine part 6. All the remaining parts, which correspond in their functions to the embodiment mentioned at the beginning, have been provided with the same reference numbers, so that the description of the embodiment shown in FIGS. 1 and 2 also applies in an equivalent manner to the embodiment illustrated in FIG. 4.

If need be, it is also conceivable to admit pressure to only one side of the annular piston 25 and effect its return by means of a spring. Moreover, it is also possible to cause a completely separate servomotor M to act on the housing 1' instead of the annular piston 25, it being possible for this to be a separate piston and cylinder unit or even an electromagnet. Finally, instead of an extension, the coupling tube may also have a sleeve which can be pushed over a corresponding extension on the rotating machine part.

The embodiments of the invention in which an exclusive property or privilege is claimed are defined as follows:

1. In a device for feeding a fluid to a fluid receiving opening in a rotating machine part, said device including a housing arranged fixed against rotation and a hollow shaft mounted rotatably in said housing, one end of said hollow shaft being connected by way of a sliding ring seal member to an inlet duct in said housing and the other end of said hollow shaft being adapted to be connected to the rotating machine part in order to permit a flow of fluid under pressure between said housing through said hollow shaft and the rotating machine part, the improvement wherein a coupling tube is provided, said coupling tube being coaxially mounted on said hollow shaft and fixed against relative rotation with respect thereto, said coupling tube being axially slidable with respect to said hollow shaft and extending axially beyond an axial end of said hollow shaft, a return spring for providing a spring force which resists one direction of relative movement between said coupling tube and said hollow shaft, means defining a fluid inlet in said hollow shaft for receiving pressurized fluid therein from said inlet duct, said coupling tube and said hollow shaft including means responsive to a supply of said pressurized fluid to said fluid inlet means for urging said coupling tube and said hollow shaft axially with respect to each other to cause said coupling tube to move towards the rotating machine part in opposition to the force of said return spring and into engagement with the fluid receiving opening in the rotating machine part, wherein a sealing means is provided for effecting a fluid tight seal of said coupling tube to the fluid receiving opening in the rotatable machine part so and can be engaged with this machine part with a sealing arrangement interposed, that, in operation with fluid, said coupling tube will be engaged with the machine part by axial movement towards it under the pressure of the fluid to supply said pressurized fluid through said coupling tube to said rotating machine part and, in operation without fluid, be disengaged from the machine part by axial movement away from it under the force of said return spring.

2. The device according to claim 1, wherein a free end of said coupling tube has an extension which can be pushed into the fluid receiving opening in the rotating machine part.

3. The device according to claim 2, wherein said extension is cylindrical.

4. The device according to claim 3, wherein said extension is adjoined by a frustoconical portion which can be pressed against a corresponding frustoconical surface in the rotating machine part in the engaged position.

5. The device according to claim 2, wherein said sealing means includes at least one O-ring seal surrounding said extension in the engaged position thereof in the fluid receiving opening.

6. The device according to claim 1, wherein an overflow tube is axially slidable in said coupling tube, an outer end of said overflow tube projecting from said extension of said coupling tube and an inner end of said overflow tube bearing against a spring-loaded valve body urged closed by a spring and in a direction of fluid flow, and wherein at least one overflow opening is provided in said overflow tube in the vicinity of said inner end, so that during a major part of the movement of said coupling tube towards the rotating machine part, the valve body bears against a valve seat therefor and is moved away from the valve seat by said inner end of said overflow tube only when said outer end of said overflow tube abuts against a shoulder in the fluid receiving opening of the rotating machine part.

7. The device according to claim 1, wherein a stop valve opening in a direction of flow of the fluid in opposition to the force of a biasing spring is arranged in said coupling tube.

8. The device according to claim 1, wherein said coupling tube has at a free end thereof a sleeve which can be pushed over a corresponding extension on the rotating machine part.

9. In a device for feeding a fluid to a fluid receiving opening in a rotating machine part, said device including a housing arranged fixed against rotation and a hollow shaft mounted rotatably in said housing, one end of said hollow shaft being connected by way of a sliding ring seal member to an inlet duct in said housing and the other end of said hollow shaft being adapted to be connected to the rotating machine part in order to permit a flow of fluid under pressure between said housing through said hollow shaft and the rotating machine part, the improvement wherein a coupling tube is provided, said coupling tube being coaxially mounted on said hollow shaft and connected fixedly to and extending axially beyond an axial end of said hollow shaft, support means for supporting said housing for movement axially with respect to the rotating machine part, a servomotor for effecting movement of said housing and said coupling tube towards the rotating machine part, and into engagement with the fluid receiving opening in the rotating machine part, wherein a sealing means is provided for effecting a fluid tight seal of said coupling tube to the fluid receiving opening in the rotatable machine part so that, in operation with fluid, said coupling tube will be engaged with the machine part by axial movement of said housing towards the latter to supply said pressurized fluid through said coupling tube to said rotating machines part and, in operation without fluid, be disengaged from the machine part by axial movement of the housing away from it.

10. The device according to claim 9, wherein said servomotor is a piston and cylinder unit.

11. The device according to claim 10, wherein said piston is an annular piston, and wherein said cylinder unit concentrically surrounds said housing, said annular piston being slidable in said cylinder unit.

12. The device according to claim 9, wherein a free end of said coupling tube has an extension which can be pushed into the fluid receiving opening in the rotating machine part.

13. The device according to claim 12, wherein said extension is cylindrical.

14. The device according to claim 12, wherein said sealing means includes at least one O-ring seal surrounding said extension in the engaged position thereof in the fluid receiving opening.

15. The device according to claim 13, wherein said extension is adjoined by a frustoconical portion which can be pressed against a corresponding frustoconical surface in the rotating machine part in the engaged position.

16. The device according to claim 9, wherein said coupling tube has at a free end thereof a sleeve which can be pushed over a corresponding extension on the rotating machine part.

* * * * *